United States Patent
Sugiya et al.

(10) Patent No.: US 10,507,693 B2
(45) Date of Patent: Dec. 17, 2019

(54) NON-PNEUMATIC TIRE

(71) Applicant: SUMITOMO RUBBER INDUSTRIES, LTD., Kobe-shi, Hyogo (JP)

(72) Inventors: Makoto Sugiya, Kobe (JP); Wako Iwamura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 386 days.

(21) Appl. No.: 15/307,942

(22) PCT Filed: May 7, 2015

(86) PCT No.: PCT/JP2015/063201
§ 371 (c)(1),
(2) Date: Oct. 31, 2016

(87) PCT Pub. No.: WO2015/178209
PCT Pub. Date: Nov. 26, 2016

(65) Prior Publication Data
US 2017/0057288 A1 Mar. 2, 2017

(30) Foreign Application Priority Data
May 22, 2014 (JP) .................. 2014-106382

(51) Int. Cl.
*B60C 7/14* (2006.01)
*B60B 9/04* (2006.01)
(Continued)

(52) U.S. Cl.
CPC .................. *B60C 7/14* (2013.01); *B60B 9/04* (2013.01); *B60B 9/26* (2013.01); *B60C 7/00* (2013.01);
(Continued)

(58) Field of Classification Search
CPC .... B60B 9/00; B60B 9/02; B60B 9/04; B60B 9/10; B60B 9/26; B60C 7/14; B60C 2007/146
See application file for complete search history.

(56) References Cited

U.S. PATENT DOCUMENTS 5,139,066 A * 8/1992 Jarman .................. B60C 7/12
152/11
9,895,933 B2 * 2/2018 Sugiya .................. B60C 7/14
(Continued)

FOREIGN PATENT DOCUMENTS

JP 4-193602 A 7/1992
JP 2008-132951 A 6/2008
(Continued)

OTHER PUBLICATIONS

"Thermal Conductivity of common Materials and Gases", www.engineeringtoolbox.com, pp. 1-7 (Year: 2018).*
(Continued)

*Primary Examiner* — Jason R Bellinger
(74) *Attorney, Agent, or Firm* — Birch, Stewart, Kolasch & Birch, LLP

(57) ABSTRACT

Provided is a non-pneumatic tire having excellent durability performance. This non-pneumatic tire is provided with an annular tread portion which contacts the road surface, an annular inner peripheral portion which is positioned radially inward of the tread portion, and multiple linking units which join the tread portion and the inner peripheral portion. The tread portion includes a first portion which contacts the road surface, and a second portion which includes an inner peripheral surface facing the inner peripheral portion. The thermal conductivity of the second portion is greater than that of the first portion.

16 Claims, 4 Drawing Sheets

(51) Int. Cl.
*B60B 9/26* (2006.01)
*B60C 7/00* (2006.01)
*B60C 7/10* (2006.01)
*B60C 11/00* (2006.01)

(52) U.S. Cl.
CPC .............. *B60C 7/102* (2013.01); *B60C 7/143* (2013.01); *B60C 11/005* (2013.01); *B60B 2360/32* (2013.01); *B60B 2360/324* (2013.01); *B60B 2360/50* (2013.01); *B60C 2007/107* (2013.01); *B60C 2007/146* (2013.01)

(56) References Cited

U.S. PATENT DOCUMENTS

| | | | |
|---|---|---|---|
| 10,040,314 B2 * | 8/2018 | Siegel | B60C 7/14 |
| 2004/0159385 A1 | 8/2004 | Rhyne et al. | |
| 2009/0283185 A1 * | 11/2009 | Manesh | B60B 9/00 |
| | | | 152/11 |
| 2013/0240272 A1 * | 9/2013 | Gass | B60B 9/00 |
| | | | 180/54.1 |
| 2016/0089935 A1 * | 3/2016 | Iwamura | B60C 7/18 |
| | | | 152/69 |
| 2017/0355227 A1 * | 12/2017 | Sugiya | B60C 1/0008 |

FOREIGN PATENT DOCUMENTS

| | | |
|---|---|---|
| JP | 4855646 B2 | 1/2012 |
| JP | 2012-35792 A | 2/2012 |
| JP | 2012-131254 A | 7/2012 |
| JP | 2013-32072 A | 2/2013 |
| WO | WO 2008/118983 A1 | 10/2008 |

OTHER PUBLICATIONS

Extended European Search Report, dated Feb. 12, 2018, for European Application No. 15796467.7.

* cited by examiner

NON-PNEUMATIC TIRE

TECHNICAL FIELD

The present invention relates to a non-pneumatic tire having an excellent durability.

BACKGROUND ART

Non-pneumatic tires which comprise an annular tread portion for coming into contact with a road surface, an annular inner portion disposed inward of the tread portion in a tire radial direction and a plurality of connecting portions connecting the tread portion and the inner portion have been known. The tread portion generally includes a portion formed of rubber or resin. In such a non-pneumatic tire, when traveling, a large hysteresis loss occurs in the tread portion by being repeated compressive and tensile deformation of the tread portion. Hysteresis loss generates heat energy that heats the tread portion. The heat tends to degrade the tread portion and will cause deterioration in durability of the non-pneumatic tire.

CITATION LIST

Patent Literature

Patent Literature 1: Japanese Unexamined Patent Application Publication No. 2008-132951
Patent Literature 2: Japanese Patent Publication No. 4855646

SUMMARY OF INVENTION

Technical Problem

The present invention has been made in view of the above circumstances, and has a main object to provide a non-pneumatic tire having an excellent durability.

Solution to Problem

The present invention provides a non-pneumatic tire including an annular tread portion for coming into contact with a road surface, an annular inner portion disposed inward of the tread portion in a tire radial direction, a plurality of connecting portions connecting the tread portion and the inner portion, wherein the tread portion includes a first portion that comes into contact with the road surface and a second portion including an inner surface facing the inner portion, and a thermal conductivity of the second portion is greater than a thermal conductivity of the first portion.

The non-pneumatic tire according to the present invention, the thermal conductivity of the second portion may preferably be twice or more the thermal conductivity of the first portion.

The non-pneumatic tire according to the present invention, the thermal conductivity of the second portion may preferably be equal to or more than 1.0 W/(m·K).

The non-pneumatic tire according to the present invention, a thickness of the second portion may preferably be in a range of from 0.001 to 2 mm.

The non-pneumatic tire according to the present invention, the second portion may preferably include, at least partially, a rough surface region having surface roughness in a range of from 1 to 30 μm.

The non-pneumatic tire according to the present invention, the first portion may preferably be made of resin or rubber.

The non-pneumatic tire according to the present invention, the first portion may preferably include an outer layer including a rubber and an inner layer disposed inward of the outer layer in the tire radial direction and made of urethane resin.

The non-pneumatic tire according to the present invention, the second portion may preferably be made of resin such as silicone-based, urethane-based and epoxy-based, or rubber.

Advantageous Effects of Invention

The present invention provides a non-pneumatic tire including an annular tread portion for coming into contact with a road surface, an annular inner portion disposed inward of the tread portion in a tire radial direction and a plurality of connecting portions connecting the tread portion and the inner portion. The tread portion includes a first portion that comes into contact with the road surface and a second portion comprising an inner surface facing the inner portion, and a thermal conductivity of the second portion is greater than a thermal conductivity of the first portion. When grounding, the first portion is heated due to repeated compressive and tensile deformation of the tread portion. The heat of the first portion is dissipated smoothly to the outside through the inner surface of the second portion which has a large thermal conductivity. Accordingly, the non-pneumatic tire according to the present invention suppresses degradation of the tread portion due to heat and exhibits an excellent durability.

DESCRIPTION OF EMBODIMENTS

An embodiment of the present invention will be explained below with reference to the accompanying drawings.

Figure 1:
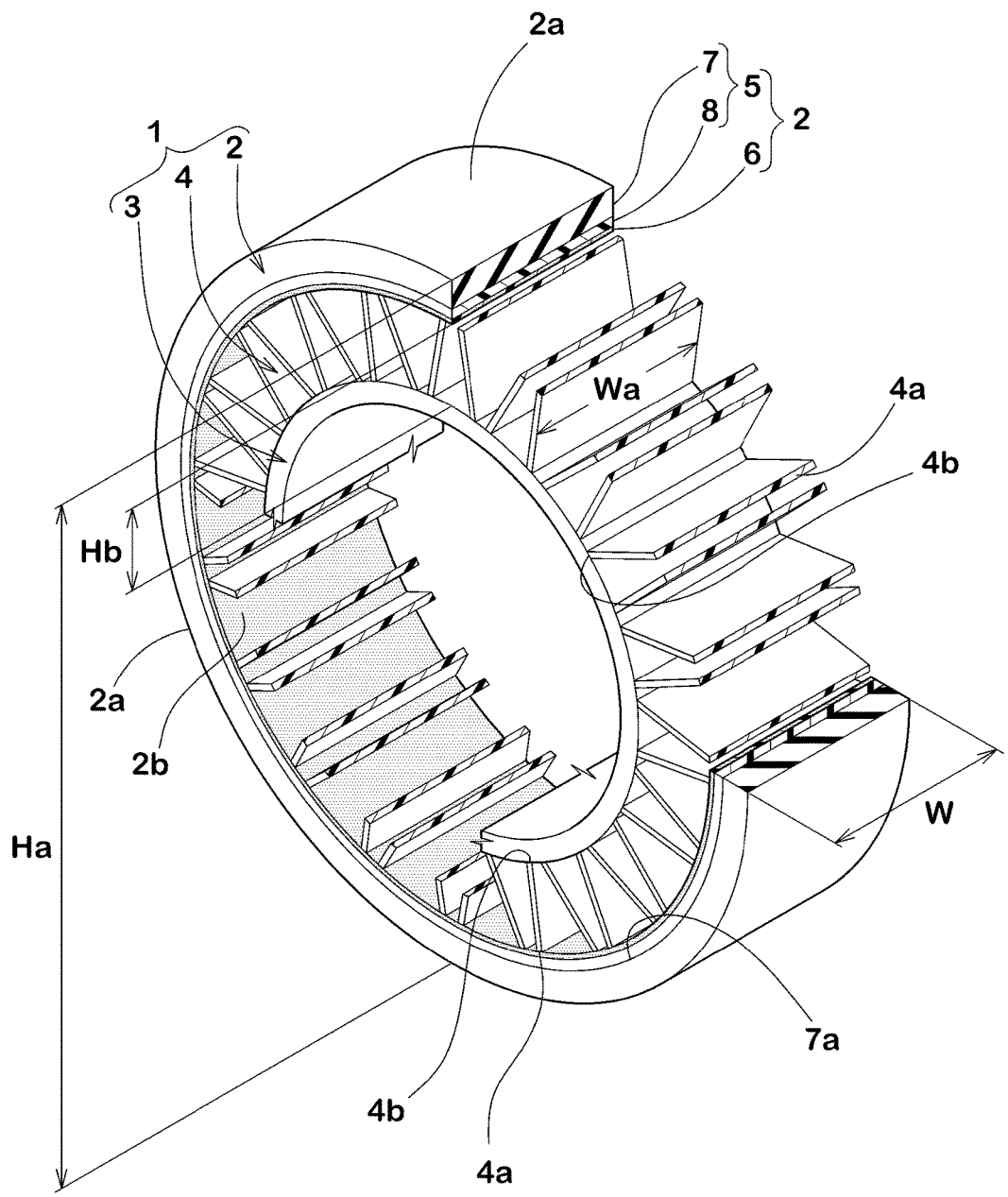
FIG. 1 is a perspective view of a non-pneumatic tire according to an embodiment of the present invention.

FIG. 1 is a perspective view of a non-pneumatic tire 1 according to an embodiment. The non-pneumatic tire 1, for example, is employed for passenger cars or heavy load vehicles. The non-pneumatic tire (hereinafter, simply may refer to as "tire") 1 can support a tire load by a structural rigidity of the tire, and thus is different from a pneumatic tire in which a compressed air is to be filled therein.

As illustrated in FIG. 1, the tire 1 includes an annular tread portion 2, an inner portion 3 disposed inward of the tread portion 2 in the tire radial direction and the connecting portions 4 connecting the tread portion 2 and the inner portion 3.

The inner portion 3 has an annular body extending continuously in the tire circumferential direction. The inner portion 3, for example, has a constant width and thickness in the tire width direction. The inner portion 3, for example, is formed of a resin material. In this embodiment, the inner portion 3 is formed of polyurethane resin.

Figure 2:
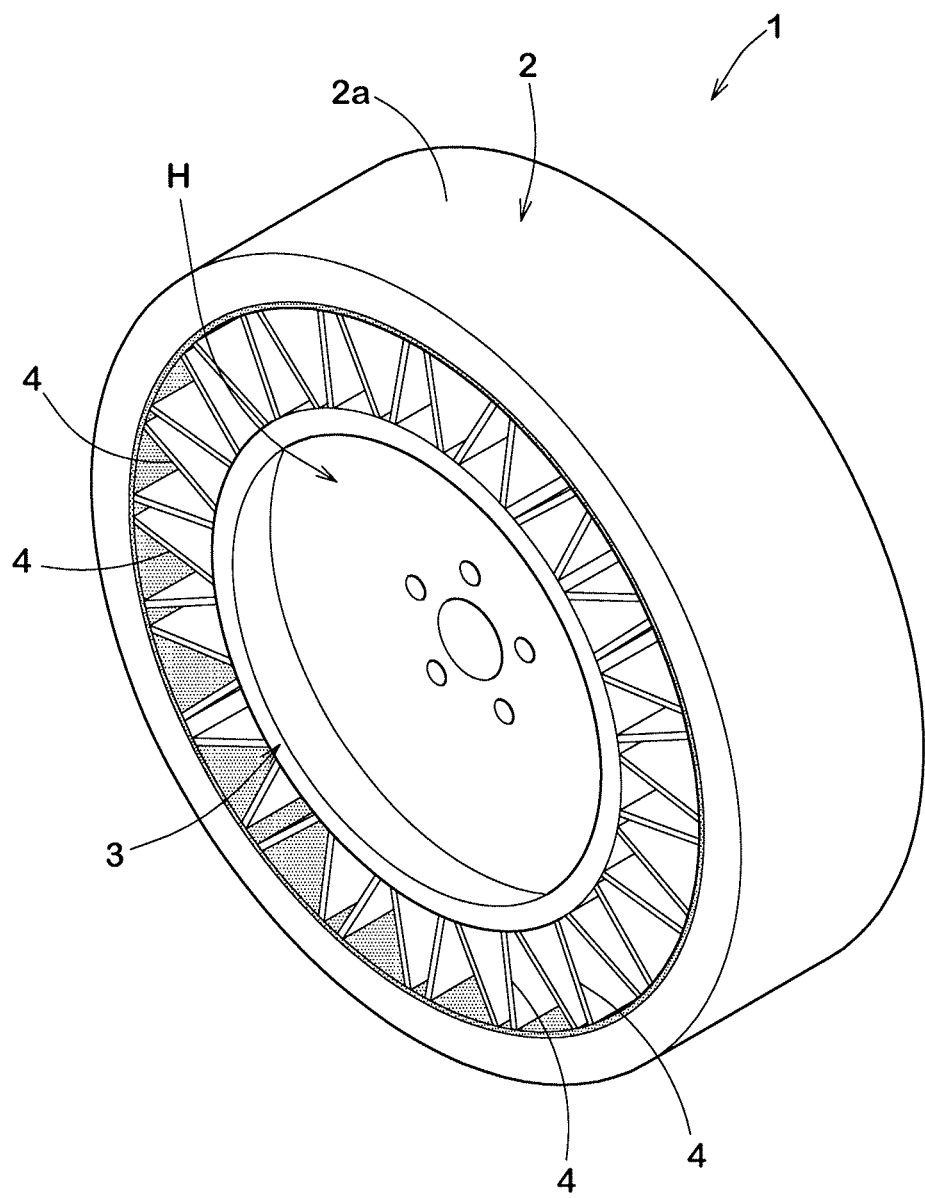
FIG. 2 is a perspective view of the non-pneumatic tire of FIG. 1 mounted on a wheel.

In this embodiment, the inner portion 3 of the tire 1, for example, is to be fixed to a wheel H, as illustrated in FIG. 2, and the wheel H differs from a wheel rim for pneumatic tires. The wheel H is to be fixed to an axle (not illustrated) of a vehicle.

As illustrated in FIG. 1, the connecting portions 4 according to the embodiment are formed in plate shapes that extend in the tire width direction, and are arranged in the tire circumferential direction. That is, a plurality of connecting portions 4 is arranged in the tire circumferential direction. When a vertical load is applied to an axle, the load is supported by tensile rigidity of the connecting portions 4 located upward of the axle and compressive rigidity of the connecting portions 4 located downward of the axle.

The connecting portions 4, for example, are inclined with respect to the tire radial direction. In this embodiment, circumferential adjacent connecting portions 4 and 4 are inclined with respect to the tire radial direction in an opposite direction from each other.

The radially outer ends 4a of the connecting portions 4 are fixed to the tread portion 2. The radially inner ends 4b of the connecting portions 4 are fixed to the inner portion 3. In this embodiment, the outer ends 4a and the inner ends 4b of the connecting portions 4 extend along the tire axial direction. The connecting portions 4, for example, have widths Wa same as the inner portion 3. Thus, high rigidity of the connecting portions 4 may be maintained. The shape of the connecting portions 4 is not limited to the above aspect, but it can employ various aspects such as a zigzag shape extending in the tire radial direction or the tire circumferential direction, and a mesh manner in a circumferential cross-section, for example.

The connecting portions 4 are formed of resin or rubber material. When the connecting portions 4 are made of rubber material, the rubber material preferably has durometer type-A hardness of from 70 to 95 degrees at temperature of 23 deg. C., based on JIS K6253. When the connecting portions 4 are made of resin material, urethane resin that has hardness capable of exerting sufficient load capacity is preferable. Such a connecting portion 4 can absorb vibration to improve riding comfort when traveling. In this embodiment, the connecting portions 4 are formed of thermosetting polyurethane.

The tread portion 2 is an annular body extending continuously in the tire circumferential direction. The tread portion 2, for example, has a constant width W. The tread portion 2 is disposed concentrically with the inner portion 3.

In this embodiment, the tread portion 2 includes a first portion 5 disposed outside and a second portion 6 having an inner surface 2b on the side of the inner portion 3.

The first portion 5 includes an outer layer 7 having a tread surface 2a that comes into contact with the road surface and an inner layer 8 disposed inward of the outer layer 7 in the tire radial direction. The outer layer 7 and the inner layer 8 are disposed concentrically with each other.

The outer layer 7 is an annular body extending continuously in the tire circumferential direction. The outer layer 7 according to the embodiment includes rubber, particularly hard rubber. The outer layer 7 may improve durability and riding comfort of the tire 1. On the other hand, the outer layer 7 may generate heat energy by hysteresis loss thereof to heat the first portion 5 since the outer layer 7 repeats compressive and tensile deformation. Note that the outer layer 7, for example, includes a reinforcing cord layer (not illustrated) in which steel or organic fiber cords are arranged.

The inner layer 8 is an annular body extending continuously in the tire circumferential direction. The inner layer 8 is connected to a radially inner surface 7a of the outer layer 7.

Figure 3:
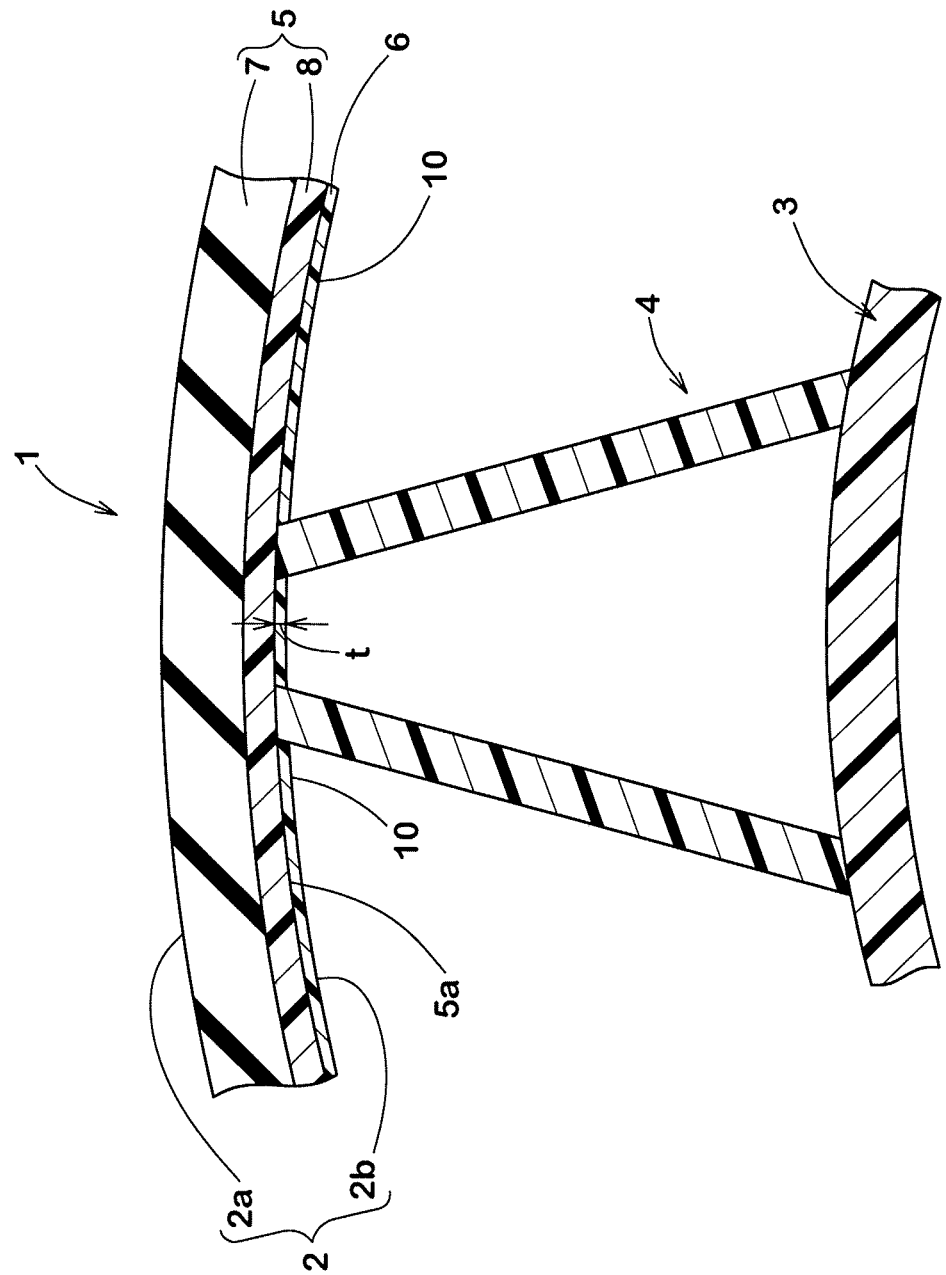
FIG. 3 is a partial enlarged cross-sectional view of the non-pneumatic tire of FIG. 1 taken along a tire circumferential direction.

FIG. 3 illustrates a partial enlarged cross-sectional view of the tire 1 taken along the tire circumferential direction. As illustrated in FIG. 3, a radially inner surface 8a of the inner layer 8 is connected to the connecting portions 4. The inner layer 8, for example, is formed of the same material as the connecting portions 4. Thus, the outer layer 7 is firmly fixed to the connecting portions 4 through the inner layer 8. In this embodiment, the inner layer 8 is joined to the outer layer 7 with an adhesive. The inner layer 8, for example, is made of urethane resin.

The second portion 6 covers a radially inner surface 5a of the first portion 5 at least partially. In this embodiment, the second portion 6 covers the whole region of the radially inner surface 5a of the first portion 5. That is, the whole radially inner surface 2a of the tread portion 2 is covered with the second portion 6.

The thermal conductivity k2 of the second portion 6 is set greater than the thermal conductivity k1 of the first portion 5. Thus, heat of the first portion 5 which is generated by grounding of the first portion 5 is dissipated smoothly to the outside the tire through the inner surface 2b of the second portion 6 which has a large thermal conductivity. Accordingly, the non-pneumatic tire 1 according to the present invention suppresses degradation in the first portion 5 of the tread portion 2 due to heat and exhibits an excellent durability. Furthermore, it may suppress degradation in the adhesive to join the outer layer 7 and the inner layer 8 to exert an excellent durability. Note that the thermal conductivity k1 of the first portion 5 means the weighted average of thermal conductivities of the outer and inner layers 7 and 8 by weighting the respective volume.

The thermal conductivity k2 of the second portion 6 is preferably twice or more the thermal conductivity k1 of the first portion 5, more preferably quadruple or more the thermal conductivity k1. When the thermal conductivity k2 of the second portion 6 is twice or more the thermal conductivity k1 of the first portion 5, heat of the first portion 5 is transmitted smoothly to the second portion 6, and then it may be dissipated through the inner surface 2b. The greater the thermal conductivity k2 of the second portion 6 in relation to the thermal conductivity k1 of the first portion 5, the better the dissipate property through the inner surface 2b is.

In order to further improve the above effect, the thermal conductivity k2 of the second portion 6 is preferably equal to or more than 1.0 W/(m·K), more preferably equal to or more than 1.9 W/(m·K). As a material for the second portion 6, resin such as silicone-based, urethane-based and epoxy-based, or rubber may preferably be employed, for example.

Preferably, the second portion 6 has a thickness t in a range of from 0.001 to 2 mm. When the thickness t of the second portion 6 is less than 0.001 mm, there is a possibility that heat of the first portion 5 may not be transmitted to the second portion 6 smoothly. When the thickness t of the second portion 6 is more than 2 mm, it may cause an increase of the tire mass as well as a reduction of the effect of heat dissipate property. In view of the above, the thickness t of the second portion 6 is preferably equal to or more than 0.01 mm, more preferably equal to or less than 1.0 mm.

As illustrated in FIG. 1, the radially inner surface 2b of the tread portion 2 includes a rough surface region 10 where the surface is roughened. The rough surface region 10 is useful to increase a surface area of the inner surface 2b. Thus, heat of the first portion 5 can be dissipated to the air more smoothly. As processes to make the rough surface region, embossing, graining and satin process and the like can preferably be employed. The rough surface region 10 according to the embodiment is provided on the whole inner surface 2b.

Preferably, the surface roughness Ra of the rough surface region 10 is in a range of from 1 to 30 μm. When the surface roughness Ra is less than 1 μm, the effect that increases the surface area of the inner surface 2b tends to be small. When the surface roughness Ra of the rough surface region 10 is more than 30 μm, there is a possibility that stress which is caused by compressive and tensile deformation during traveling may concentrate on a portion of the rough surface region 10 to cause a crack. Thus, the surface roughness Ra of the rough surface region 10 is more preferably in a range of from 2 to 20 μm. As used herein, "surface roughness" is a calculation average height (a calculation average height of a roughness curve) defined by JIS B0601: 2001, "Geometrical Product Specifications (GPS)-Surface texture: Profile method-Terms, definitions and surface texture parameters".

Figure 4:
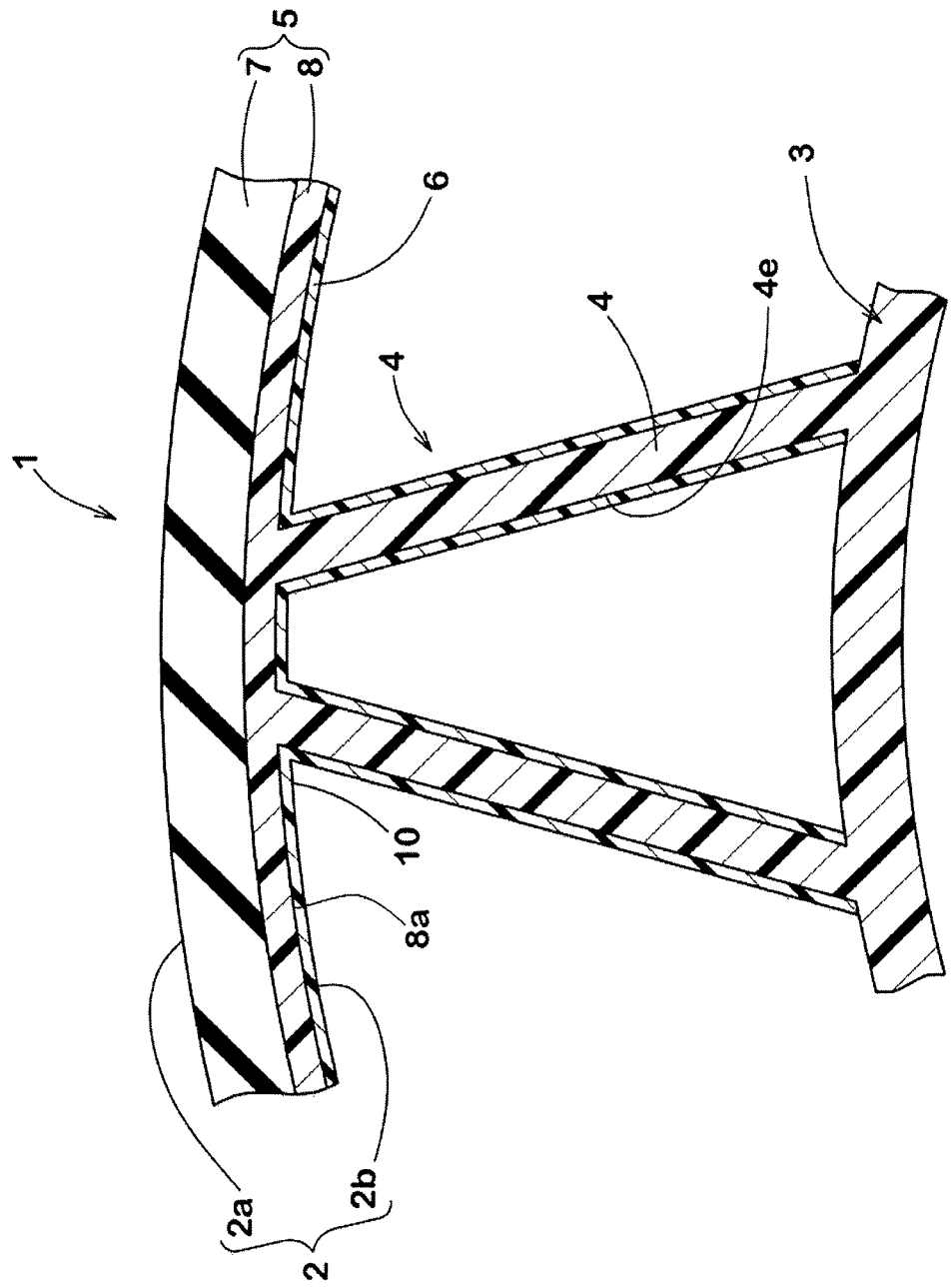
FIG. 4 is a partial enlarged cross-sectional view of the non-pneumatic tire according to another embodiment.

FIG. 4 illustrates a partial cross-sectional view in accordance with another embodiment of the tire 1. As illustrated in FIG. 4, in this embodiment, the outer surfaces 4e of the connecting portions 4 are covered with the same material as the second portion 6. Thus, not only internal heat of the first portion 5 but also internal heat of the connecting portions 4 is dissipated smoothly outside the tire, and therefore durability of the tire 1 can further be improved.

While the particularly preferable embodiments of non-pneumatic tire in accordance with the present invention have been described in detail, the present invention is not limited to the illustrated embodiments, but can be modified and carried out in various aspects.

Example

Non-pneumatic tires having a basic structure illustrated in FIG. 1 were manufactured based on the specifications of Table 1, and then heat-generating property and crack-damage resistance of the tires were tested. Common specifications of the tires and test procedures are as follows.

Tire outer diameter Ha: 635 mm
Tread portion width W: 195 mm
Material of outer layer of first portion: natural rubber and styrene-butadiene rubber
Material of inner layer of first portion: thermosetting polyurethane resin (thermal conductivity: 0.25 W/(m·K))
Thermal conductivity $k_1$ of first portion: 0.21 W/(m·K)
Material of second portion: silicone based rubber (thermal conductivity $k_2$: 1.9 W/(m·K))
Material of second portion: urethane based rubber (thermal conductivity $k_2$: 0.8 W/(m·K))
Material of inner portion: thermosetting polyurethane resin
Radial heights of connecting portions Hb: 90 mm
Widths of connecting portions Wa: 185 mm
Material of connecting portions: thermosetting polyurethane resin Tire Heat Generating Property Test:

Each of the tires was made to run on a drum tester under the following conditions, and then the mean temperature of the inner surface of the tread portion was measured using a thermal image device (surface thermometer). The results are indicated in Table 1 using an index based on Ref. 1 being 100. The smaller the value, the better the property is.

Traveling distance: 10 km
Tire load: 4.55 kN
Traveling speed: 60 km/hr

Crack-Damage Resistance Test:

Using the above mentioned drum tester, each of the tires was made to run under the following conditions, and then the inner surface of the tread portion was observed to check whether a crack is generated thereon. The results are indicated in Table 1 using a three-grade evaluation as follows. The smaller the value, the better the resistance is.

Traveling distance: 10,000 km
Tire load: 4.55 kN
Traveling speed: 60 km/hr
Three-grade evaluation
1: No cracks occurred.
2: Crack(s) occurred in length less than 2 mm.
3: Crack(s) occurred in length equal to or more than 2 mm.

The test results are shown in Table 1.

TABLE 1

| | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Thermal conductivity of second portion W/(m · K) | — | 1.9 | 0.8 | 1.0 | 1.9 | 1.9 | 1.9 | 1.9 | 1.9 | 1.9 | 1.9 | 1.9 |
| Thickness t of second portion (mm) | 0 | 0.5 | 0.5 | 0.5 | 0.001 | 0.1 | 2.0 | 2.5 | 0.5 | 0.5 | 0.5 | 0.5 |
| Surface roughness Ra (μm) | — | 1.5 | 1.5 | 1.5 | 1.5 | 1.5 | 1.5 | 1.5 | 0.9 | 1.0 | 30 | 40 |
| Heat generating property (index; the smaller, the better) | 100 | 90 | 96 | 95 | 94 | 93 | 91 | 92 | 92 | 93 | 95 | 95 |
| Crack-damage resistance (three-grade evaluation; the smaller, the better) | 3 | 1 | 2 | 2 | 1 | 1 | 1 | 2 | 2 | 1 | 1 | 2 |

From the test results, it is confirmed that the embodiment tires had low temperature on the inner surface compared with the comparative example tire. Furthermore, it is also confirmed that the embodiment tires received less damage due to cracks than the comparative example tire. This means that the embodiment tires have a higher improved durability than that of the comparative example tire. Furthermore, a similar result was obtained in another test where rubber and resin having different thermal conductivities from those of the above test were used.

The invention claimed is:

1. A non-pneumatic tire comprising:
   an annular tread portion comprising a first portion and a second portion, the first portion comprising an outer layer made of rubber having a tread surface for coming into contact with a road surface and an inner layer being an annular body and connected to a radially inner surface of the outer layer, the second portion disposed radially inwardly of the first portion such that the second portion covers a radially inner surface of the first portion at least partially;
an annular inner portion disposed inward of the tread portion in a tire radial direction; and
a plurality of connecting portions connecting the tread portion and the inner portion,
wherein the second portion comprises a radial inner surface facing the inner portion so that the inner surface of the second portion is configured to be exposed to open air when the tire travels, the inner surface of the second portion comprising, at least partially, a rough surface region having surface roughness in a range of from 1 to 30 μm, and a thermal conductivity of the second portion is greater than a thermal conductivity of the first portion.

2. The non-pneumatic tire according to claim 1, wherein the thermal conductivity of the second portion is twice or more the thermal conductivity of the first portion.

3. The non-pneumatic tire according to claim 1, wherein the thermal conductivity of the second portion is equal to or more than 1.0 W/(m·K).

4. The non-pneumatic tire according to claim 1, wherein a thickness of the second portion is in a range of from 0.001 to 2 mm.

5. The non-pneumatic tire according to claim 1, wherein the inner layer of the first portion is made of urethane resin.

6. The non-pneumatic tire according to claim 1, wherein the second portion is made of resin, the resin being any one of silicone-based, urethane-based and epoxy-based, or rubber.

7. The non-pneumatic tire according to claim 2, wherein the thermal conductivity of the second portion is equal to or more than 1.0 W/(m·K).

8. The non-pneumatic tire according to claim 2, wherein a thickness of the second portion is in a range of from 0.001 to 2 mm.

9. The non-pneumatic tire according to claim 3, wherein a thickness of the second portion is in a range of from 0.001 to 2 mm.

10. The non-pneumatic tire according to claim 2, wherein the second portion is made of resin, the resin being any one of silicone-based, urethane-based and epoxy-based, or rubber.

11. The non-pneumatic tire according to claim 3, wherein the second portion is made of resin, the resin being any one of silicone-based, urethane-based and epoxy-based, or rubber.

12. The non-pneumatic tire according to claim 1, wherein the plurality of connecting portions is made of urethane-based resin.

13. The non-pneumatic tire according to claim 1, wherein an outer surface of the plurality of connecting portions is covered with a same material as the second portion.

14. The non-pneumatic tire according to claim 1, wherein a thermal conductivity of the second portion is quadruple or more a thermal conductivity of the first portion.

15. The non-pneumatic tire according to claim 1, wherein the rough surface region is provided on a whole area of the inner surface of the second portion.

16. A non-pneumatic tire, comprising:
an annular tread portion comprising a first portion and a second portion disposed radially inwardly of the first portion such that the second portion covers a radially inner surface of the first portion at least partially,
wherein the first portion comprises an outer layer made of rubber having a tread surface for coming into contact with a road surface and an annular inner layer made of urethane resin and connected to a radially inner surface of the outer layer,
wherein the second portion is made of any one of silicone-based, urethane-based and epoxy-based resin and has a thickness in a range of 0.001 to 2 mm,
wherein the second portion comprises a radially inner surface facing the inner portion so that the inner surface of the second portion is exposed to open air when the tire travels, the inner surface of the second portion comprising, at least partially, a rough surface region having surface roughness in a range from 1 to 30 μm, and
wherein a thermal conductivity of the second portion is greater than a thermal conductivity of the first portion;
an annular portion disposed inward of the tread portion in a tire radial direction; and
a plurality of connecting portions connecting the tread portion and the inner portion.

* * * * *